(12) United States Patent
Jarman et al.

(10) Patent No.: US 11,708,188 B2
(45) Date of Patent: Jul. 25, 2023

(54) LIGHTWEIGHT POLYMERIC CONTAINER FINISH

(71) Applicant: AMCOR RIGID PACKAGING USA, LLC, Ann Arbor, MI (US)

(72) Inventors: Jonathan P. Jarman, Ann Arbor, MI (US); Luke A. Mast, Brooklyn, MI (US); Ivan F. Harris, Ypsilanti, MI (US); Bradley S. Philip, Tecumseh, MI (US); Myles Graybill, South Lyon, MI (US); Richard J. Steih, Jackson, MI (US); Kevin Gaydosh, Adrian, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 54 days.

(21) Appl. No.: 16/698,213

(22) Filed: Nov. 27, 2019

(65) Prior Publication Data
US 2020/0095005 A1    Mar. 26, 2020

Related U.S. Application Data

(63) Continuation-in-part of application No. 15/955,288, filed on Apr. 17, 2018, now Pat. No. 10,974,859,
(Continued)

(51) Int. Cl.
*B65D 1/02*     (2006.01)
*B29C 49/42*    (2006.01)
(Continued)

(52) U.S. Cl.
CPC ........ *B65D 1/0246* (2013.01); *B29C 49/4205* (2013.01); *B65D 1/0207* (2013.01);
(Continued)

(58) Field of Classification Search
CPC .......... B65D 1/0246; B65D 1/46; B65D 1/44; B65D 41/3442; B65D 1/0207; B65D 41/3428; B65D 2501/0081
See application file for complete search history.

(56) References Cited

U.S. PATENT DOCUMENTS 4,461,392 A    7/1984    Conti
6,089,390 A    7/2000    Druitt et al.
(Continued)

FOREIGN PATENT DOCUMENTS

DE    202007009983 U1    10/2007
EP        1072528 A1     1/2001
(Continued)

OTHER PUBLICATIONS

U.S. Appl. No. 15/955,288, filed Apr. 14, 2019, Jarman et al.
(Continued)

*Primary Examiner* — Stephen J Castellano
(74) *Attorney, Agent, or Firm* — Harness, Dickey & Pierce, P.L.C.

(57) ABSTRACT

A polymeric container including a base, a body, a finish, finish threads, and a tamper lip. The finish threads are at an outer surface of the finish, and are configured to cooperate with closure threads of a closure to secure the closure to the finish. The tamper lip extends from the outer surface of the finish, and is configured to replace the support flange during handling, and to cooperate with a tamper band of the closure. A recess is below the tamper lip. The recess retains the tamper band below the tamper lip when the closure is removed from cooperation with the finish. A gripper pad is between the finish threads and the tamper lip. The gripper pad is configured to cooperate with a gripper for grasping the finish.

5 Claims, 12 Drawing Sheets

Related U.S. Application Data which is a continuation-in-part of application No. 15/763,778, filed as application No. PCT/US2017/025399 on Mar. 31, 2017, now Pat. No. 10,569,924.

(60) Provisional application No. 62/411,029, filed on Oct. 21, 2016.

(51) Int. Cl.
*B65D 41/34* (2006.01)
*B29L 31/00* (2006.01)

(52) U.S. Cl.
CPC .... *B65D 41/3428* (2013.01); *B29L 2031/712* (2013.01); *B65D 2501/0081* (2013.01)

(56) References Cited

U.S. PATENT DOCUMENTS

| | | | |
|---|---|---|---|
| 7,694,835 | B1 | 4/2010 | Montgomery |
| 9,254,941 | B2 | 2/2016 | Galownia et al. |
| 9,359,099 | B2 | 6/2016 | Zoppas et al. |
| 2006/0204694 | A1 | 9/2006 | Porter et al. |
| 2008/0257849 | A1 | 10/2008 | Farrar et al. |
| 2009/0008360 | A1 | 1/2009 | Piccioli et al. |
| 2009/0078668 | A1 | 3/2009 | Kraft |
| 2009/0230076 | A1 | 9/2009 | Roubal et al. |
| 2009/0283492 | A1 | 11/2009 | Molinaro et al. |
| 2010/0089863 | A1 | 4/2010 | Matsuoka |
| 2010/0270256 | A1 | 10/2010 | Penny |
| 2011/0278313 | A1 | 11/2011 | Labadie et al. |
| 2014/0103003 | A1 | 4/2014 | Giovannini et al. |
| 2015/0202818 | A1 | 7/2015 | Marin |
| 2015/0274378 | A1 | 10/2015 | Galownia et al. |
| 2016/0001913 | A1 | 1/2016 | Koenig |
| 2017/0210503 | A1 | 7/2017 | de Cleir et al. |
| 2018/0362226 | A1 | 12/2018 | Philip et al. |

FOREIGN PATENT DOCUMENTS

| | | |
|---|---|---|
| WO | 2005097453 A1 | 10/2005 |
| WO | 2009-112284 A1 | 9/2009 |
| WO | 2016019321 A1 | 2/2016 |

OTHER PUBLICATIONS

U.S. Appl. No. 15/763,778, filed Mar. 27, 2019, Jarman et al.
Office Action issued in corresponding European Patent Application No. 17857655.9 dated Jan. 14, 2020.
U.S. Appl. No. 15/955,288, filed Apr. 17, 2018, Jarman et al.
U.S. Appl. No. 16/698,263, filed Nov. 27, 2019, Jarman et al.
U.S. Appl. No. 16/698,310, filed Nov. 27, 2019, Jarman et al.
Office Action issued on corresponding Indian Patent Application No. 20181703112 dated Jan. 20, 2021 (7 pages).
International Search Report and Written Opinion of the International Searching Authority issued in PCT/US2017/025399, dated Jul. 11, 2017; ISA/KR.
International Search Report and Written Opinion of the International Searching Authority issued in PCT/US2018/028336, dated Jan. 7, 2019.
Supplementary European Search Report dated May 10, 2019 issued in corresponding European patent application No. 178576559 (8 pages).
U.S. Appl. No. 16/698,263, filed Nov. 27, 2019, Jonathan P. Jarman.
U.S. Appl. No. 16/698,310, filed Nov. 27, 2019, Jonathan P. Jarman.

LIGHTWEIGHT POLYMERIC CONTAINER FINISH

CROSS-REFERENCE TO RELATED APPLICATIONS

This application is a continuation-in-part of U.S. Application Ser. No. 15/955,288 filed Apr. 17, 2018, now U.S. Pat. No. 10,974,859, which is a continuation-in-part of U.S. Application Ser. No. 15/763,778 filed on Mar. 27, 2018, now U.S. Pat. No. 10,569,924, which claims the benefit and priority of and is the national stage (Rule 371) of International Application No. PCT/US2017/025399 filed on Mar. 31, 2017, which claims the benefit and priority of U.S. Provisional Application No. 62/411,029 filed on Oct. 21, 2016. The entire disclosures of these patent applications are incorporated herein by reference.

FIELD

The present disclosure relates to a lightweight finish for polymeric storage containers.

BACKGROUND

This section provides background information related to the present disclosure, which is not necessarily prior art.

It is common in the packaging industry to use blow molded polymeric containers made of polyethylene terephthalate (PET), polypropylene (PP), or polyethylene (PE), as well as any other suitable materials, to store food and beverage type products, such as spirits, sauces, carbonated soda, juice, water, sports drinks, and the like. Most containers have a threaded finish at the opening of the container configured to cooperate with a threaded closure or cap in order to hermetically seal the contents inside the container. In the packaging industry, lightweight containers are preferred because they are relatively less costly to manufacture and transport.

While current polymeric containers are suitable for their intended use, they are subject to improvement. The present teachings advantageously provide for improved polymeric containers having a finish portion that is relatively lighter in weight as compared to current containers. The containers according to the present teachings also advantageously maintain proper fitment with a closure to ensure that the fill product remains sealed during distribution of the container until the container is ultimately opened by the consumer. Further, the containers according to the present teaching include features that allow the containers, and preforms thereof, to be supported in a blow mold during blow molding and be handled during the filling process without having a standard support flange.

SUMMARY

This section provides a general summary of the disclosure, and is not a comprehensive disclosure of its full scope or all of its features.

The present teachings provide for a polymeric container including a base, a body, a finish, finish threads, and a tamper lip. The finish threads are at an outer surface of the finish, and are configured to cooperate with closure threads of a closure to secure the closure to the finish. The tamper lip extends from the outer surface of the finish, and is configured to replace the support flange during handling, and to cooperate with a tamper band of the closure. A recess is below the tamper lip. The recess retains the tamper band below the tamper lip when the closure is removed from cooperation with the finish. A gripper pad is between the finish threads and the tamper lip. The gripper pad is configured to cooperate with a gripper for grasping the finish.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
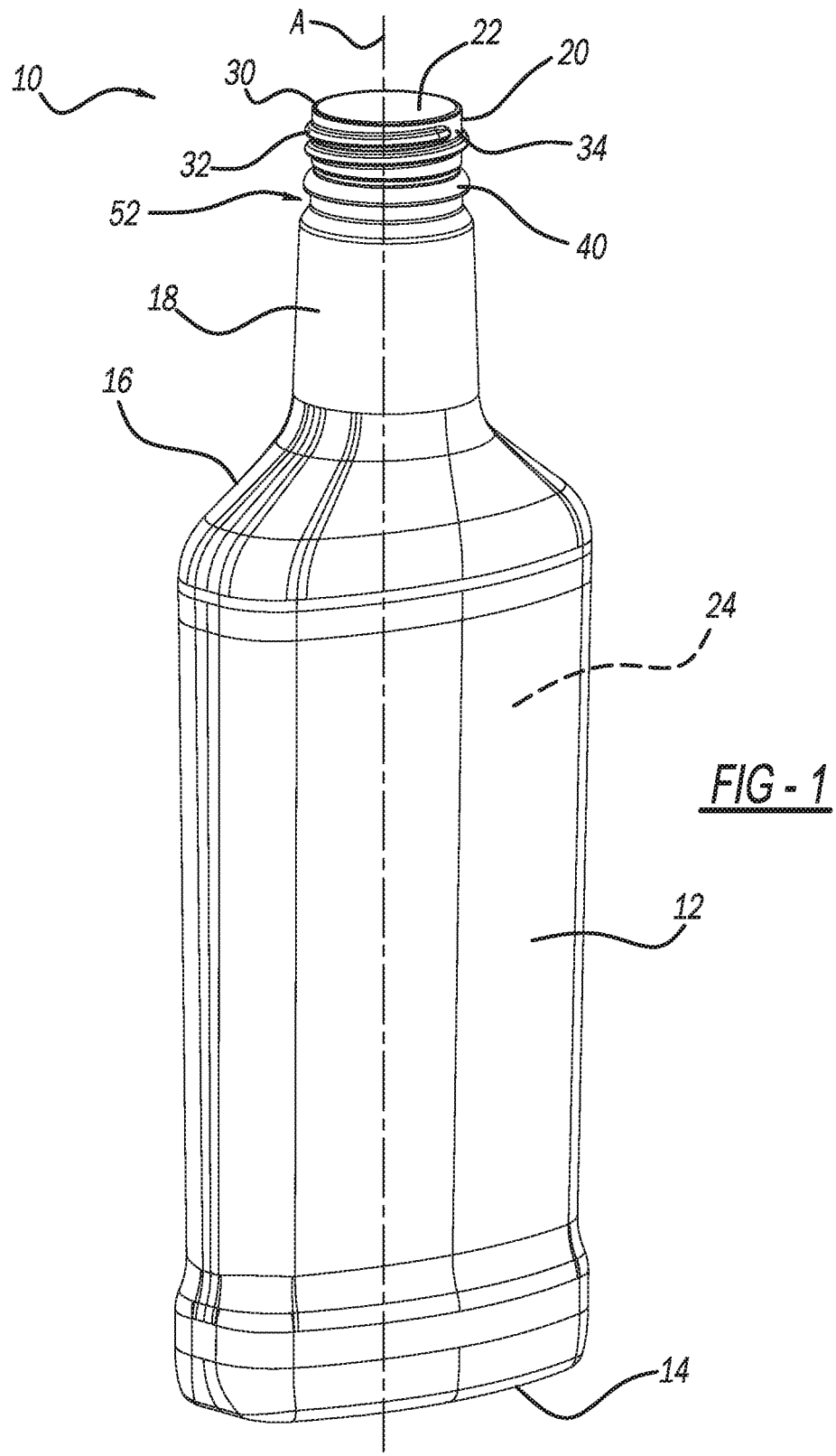
FIG. 1 is a perspective view of a container according to the present teachings.
Figure 11:
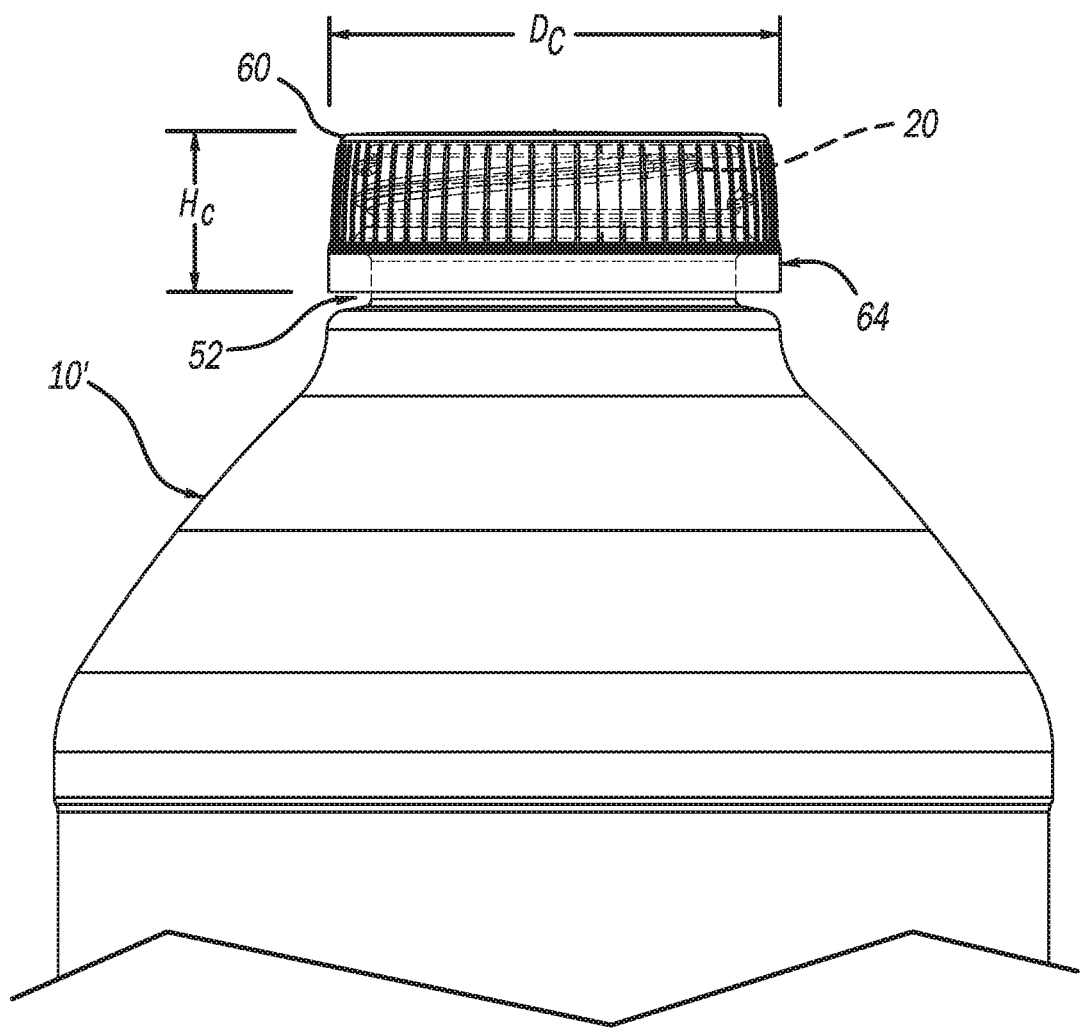
FIG. 11 illustrates another container according to the present disclosure, the container not including an elongated neck portion.

With initial reference to FIG. 1, a container according to the present teachings is generally illustrated at reference numeral 10. The container 10 can be made of any suitable material, such as any suitable polymeric material including polyethylene terephthalate (PET), polypropylene (PP), or polyethylene (PE). The container 10 generally includes a body 12, a base 14, a shoulder 16, a neck 18, and a finish 20. The neck 18 is optional, and thus in some applications the finish 20 may be adjacent to the shoulder 16, as illustrated in FIG. 11 for example. The body 12 is between the base 14 and the shoulder 16. The base 14 can be any suitable container base configured to support the container 10 upright on a flat surface. The shoulder 16 extends from the body 12 to the neck 18. The neck 18 extends from the shoulder 16 to the finish 20, and thus the neck 18 is between the shoulder 16 and the finish 20. The neck 18 can have any suitable diameter $D_N$ (see FIG. 2) measured generally where the neck 18 transitions to the finish 20. One object of the invention is the diameter $D_N$ can be the same as, or similar to, an outer diameter $D_C$ of closure 60 (see FIGS. 5 and 7), which provides a smooth aesthetic transition from the closure 60 to the neck 18 of the finish 20. This is advantageous to provide a premium look to the customer.

The container 10 can be configured to store any suitable product therein, such as spirits (liquor), alcohol, carbonated soda, juice, water, sports drinks, and any suitable type of food stuffs, such as sauces. The container 10 can have any suitable shape and size. For example, the body 12, base 14, and shoulder 16, can have a generally oblong shape as illustrated. The neck 18 can be generally circular or oblong as well. The finish 20 is generally circular. The container 10 may have any other suitable shape in addition to that which is illustrated. For example, the body 12, the base 14, the shoulder 16, and the neck 18 can each be round, or generally round.

The finish 20 defines an opening 22 of the container 10. The opening 22 provides access to an internal volume 24 of the container 10. The internal volume 24 can have any suitable capacity, such as 500 ml or less than 500 ml, or greater than 500 ml such as 1 liter or 1.5 liters. The container 10 may be filled with any suitable product through the opening 22, and any product stored within the container 10 may be dispensed through the opening 22. The opening 22 provides access to the internal volume 24. A longitudinal access A of the container 10 extends through a radial center of the opening 22, and through a center of each of the neck 18, the shoulder 16, the body 12, and the base 14.

A top surface 30 of the finish 20 extends around the opening 22, and defines the opening 22 at a top end of the container 10. The top surface 30 may be smooth, or include any suitable surface features configured to reduce the weight of the finish 20, as further explained herein and illustrated in FIGS. 4A and 4B. The finish 20 includes finish threads 32 at an outer surface 34 of the finish 20. In the example illustrated, the threads 32 extend outward from the outer surface 34, but in some configurations the threads 32 may be recessed within the outer surface 34. The outer surface 34 is opposite to an inner surface 36 (FIG. 3) of the finish 20. The threads 32 are configured to cooperate with closure threads of any suitable closure, such as the threads 70 of the closure 60 of FIGS. 5 and 6 described herein.

Figure 2:
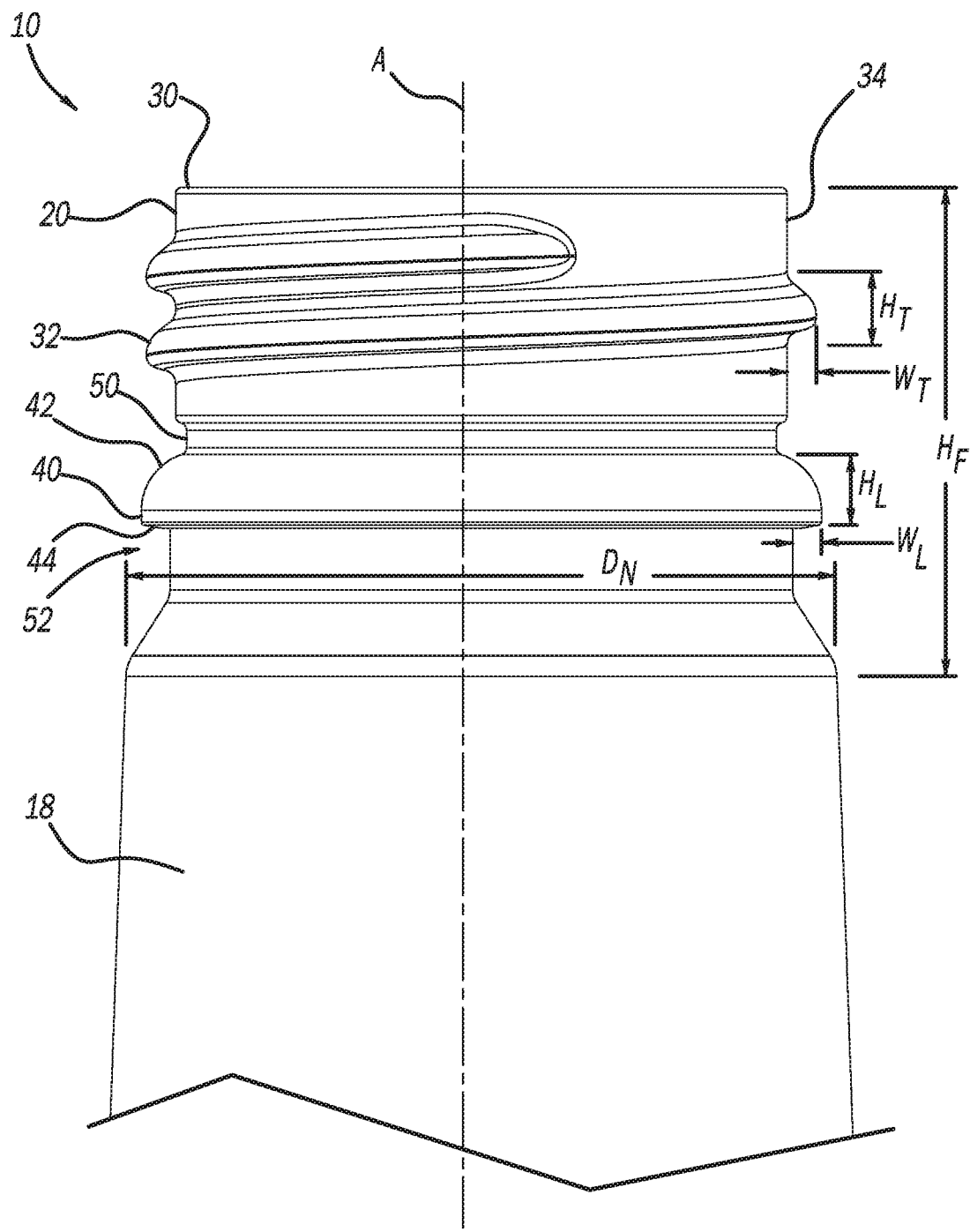
FIG. 2 is a side view of a finish portion, and part of a neck portion, of the container of FIG. 1.

With reference to FIG. 2, the finish threads 32 can have any suitable height $H_T$, such as less than 0.04 inches. The finish threads 32 can have any suitable width $W_T$ measured from the outer surface 34. For example, the threads 32 can have a width $W_T$ of less than 0.025 inches. The finish 20 has a finish height $H_F$, which extends from the top surface 30 to generally where the finish 20 and neck 18 meet. The finish height $H_F$ can be any suitable height, such as between 0.54 inches to 0.80 inches.

The finish 20 further includes a tamper lip 40. Another object of the invention is the tamper lip 40 is the only feature generally located between the threads 32 and the neck 18. The tamper lip 40 is generally circular and extends outward from the outer surface 34 of the finish 20. The tamper lip 40 is configured to engage a tamper tab of any suitable closure for the container 10, such as the tamper tab 72 of the tamper band 64 of the closure 60 illustrated in FIG. 6. The tamper lip 40 can have any suitable height $H_L$ measured generally parallel to the longitudinal axis A. For example, the tamper lip 40 can have a height $H_L$ of less than 0.06 inches. The tamper lip 40 can have any suitable width measured from the outer surface 34. For example, the tamper lip 40 can have a width $W_L$ of less than 0.025 inches.

Figure 8:
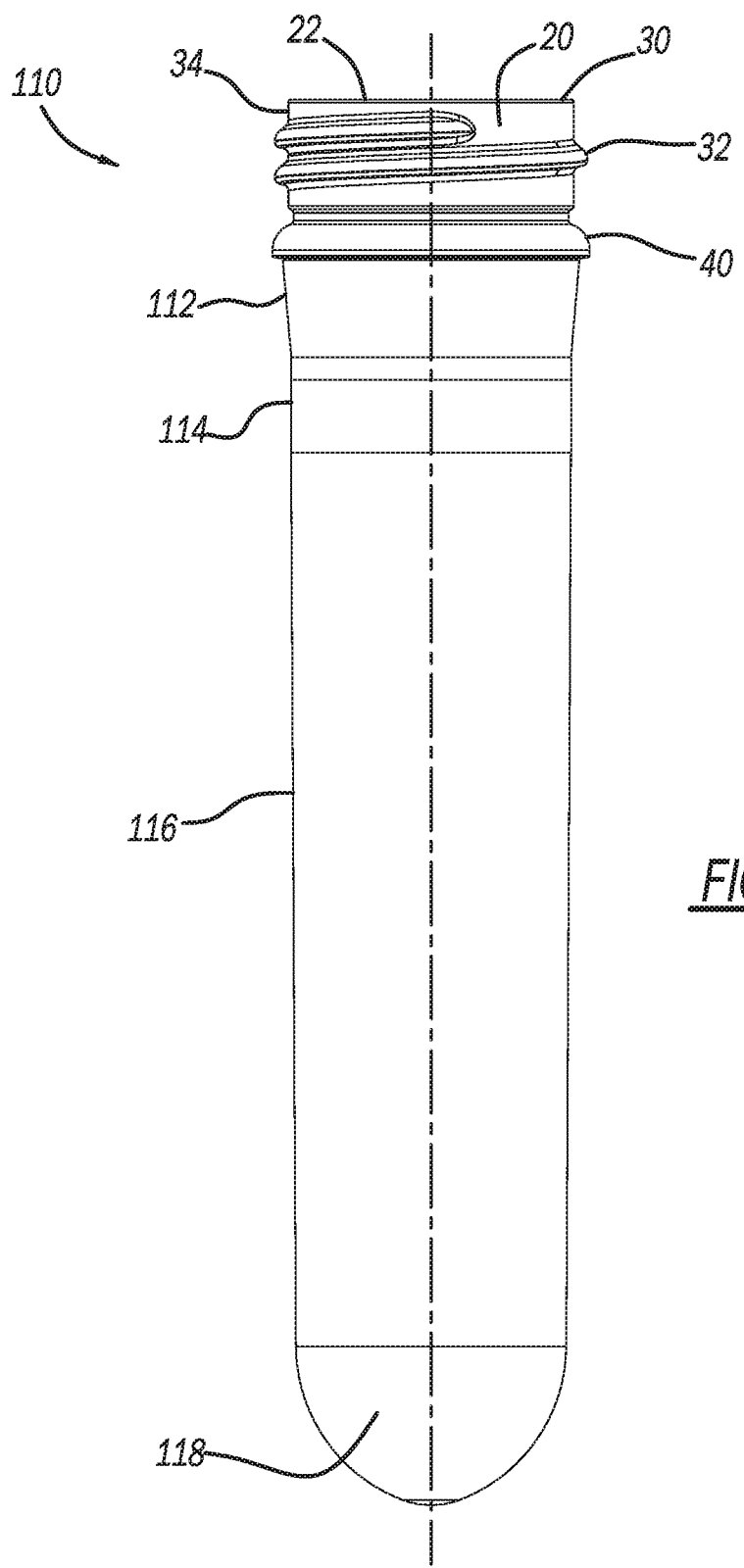
FIG. 8 is a side view of a preform according to the present teachings, from which the container of FIG. 1 can be blow molded.

The tamper lip 40 can have a generally rounded upper surface 42, and a generally planar lower surface 44. The rounded upper surface 42 extends from the outer surface 34 outward and down to the lower surface 44. The lower surface 44 extends inward from the rounded upper surface 42 back to the outer surface 34. The tamper lip 40 is advantageously configured such that during blow molding the tamper lip 40 can be engaged to support a preform, such as preform 110 of FIG. 8, for the container 10 in a mold or a blow mold striker plate, on the infeed rails of a blow molding machine, and on a star wheel assembly, thereby eliminating the need for a separate support flange (not shown), which advantageously reduces the weight and height of the finish 20 and container 10. By reducing the height of the finish 20, many suitable adjustments can be made to the blow molding equipment, such as reducing the height of spindles that transfer the preform 110 through a blow mold oven, and adjusting blow mold heating lamp positions within the blow mold oven.

Between the tamper lip 40 and the threads 32 is a gripper groove 50. The gripper groove 50 provides an area of the finish 20 that is particularly suitable for engagement by any suitable infeed and outfeed gripping or coupling device for moving the container 10/preform 110 as the container 10 is being formed. The gripping or coupling device can also engage the container 10 below the tamper lip 40. The gripping or coupling device can also engage the container 10 at the gripper groove 50 and below the tamper lip 40 simultaneously.

Below the tamper lip 40 is a tamper band recess 52. The tamper band recess 52 can be formed by injection molding as part of the container preform 110, or formed as a blow molded feature in the container 10.

Figure 3:
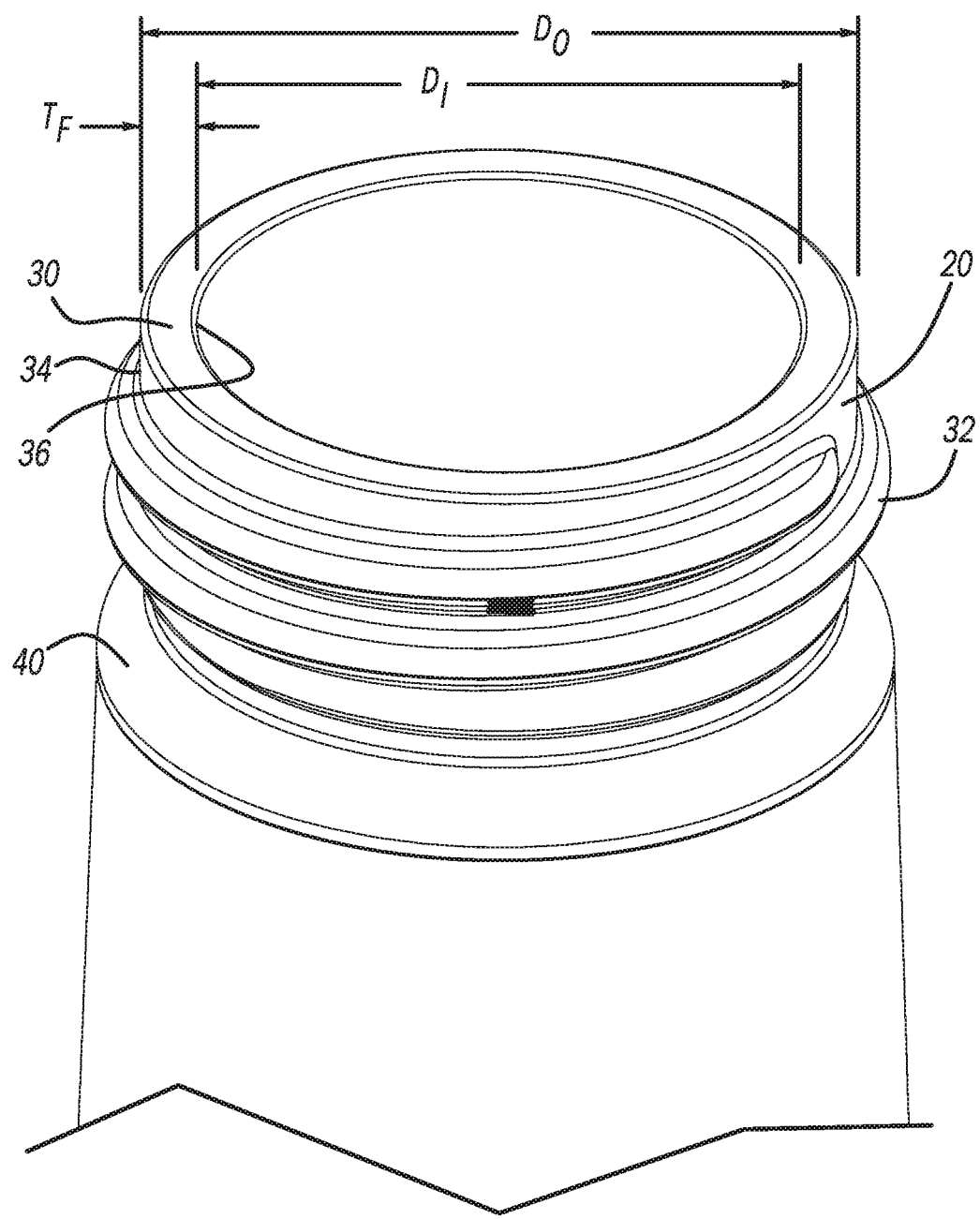
FIG. 3 is a perspective view of the finish of the container of FIG. 1.

With reference to FIG. 3, the finish 20 can have any suitable diameter for accepting industry standard closures, such as 18 mm, 22 mm, 26 mm, 28 mm, 33 mm, 38 mm, or 43 mm. Specifically, for example, the outer surface 34 of the finish 20 can have any suitable maximum outer diameter $D_O$, such as less than 25 mm or greater than 30 mm. The inner surface 36 of the finish 20 can have any suitable maximum inner diameter $D_I$, such as less than 22 mm. The finish 20 can have any suitable thickness or width $T_F$ between the outer surface 34 and the inner surface 36. For example, the thickness $T_F$ of the finish 20 as measured between the outer surface 34 and the inner surface 36 can be less than 0.045 inches.

The finish 20 advantageously allows the finish weight to be less than the finish weight of current containers. For example, the finish 20 may have the following finish weights for the following finish heights and standard finish sizes as recognized by the International Society of Beverage Technologists (ISBT).

| Standard ISBT Finish Size | Finish Height* | Finish Weight |
| --- | --- | --- |
| <26 mm | <6 mm | <2 g |
| 26 mm | <7 mm | <2.5 g |
| 28 mm | <10 mm | <3 g |
| 33 mm | <12 mm | <3.5 g |
| 38 mm | <13 mm | <4.5 g |
| 43 mm | <14 mm | <5.5 g |

*Measured from top surface 30 of finish 20 to lower surface 44 of tamper lip 40.

Figure 4A:
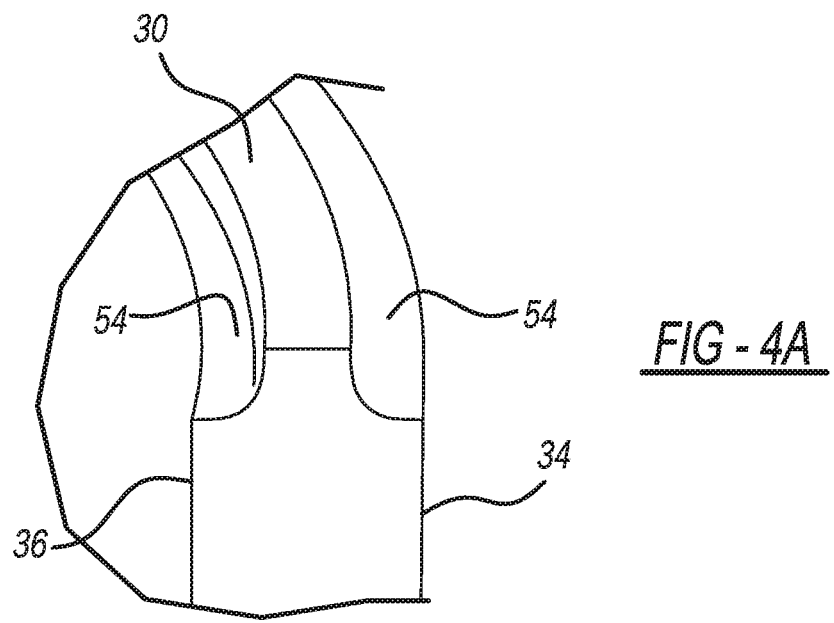
FIG. 4A illustrates a top surface of the finish of the container of FIG. 1, the top surface including rounded edges in accordance with the present teachings.
Figure 4B:
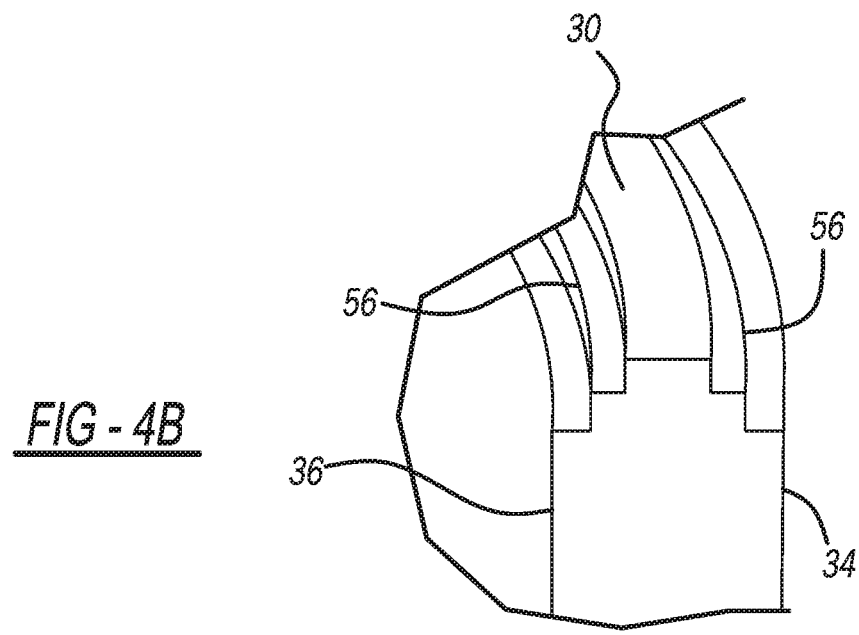
FIG. 4B illustrates a top surface of the finish of the container of FIG. 1, the top surface including stepped edges in accordance with the present teachings.

With reference to FIG. 4A, inner and outer edges of the top surface 30 can be removed at the outer and inner surfaces 34 and 36 to provide the top surface 30 with generally rounded edges 54. Due to the rounded edges, the finish 20 has less material, and is thus advantageously lighter. As illustrated in FIG. 4B, the edges 54 need not be rounded, but can rather be stepped to provide stepped edges 56, which advantageously also reduces the weight of the finish 20. Other combinations of steps and rounded edges to make the finish 20 lighter will be apparent to those skilled in the art.

Figure 5:
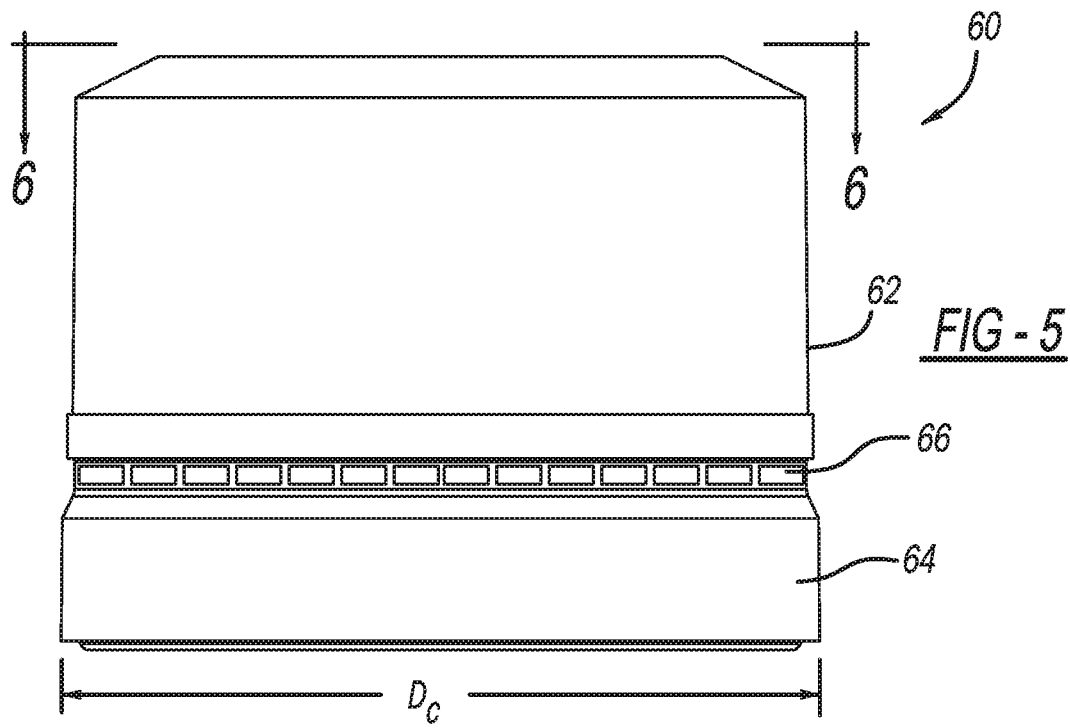
FIG. 5 is a side view of a closure according to the present teachings for closing the container of FIG. 1.
Figure 6:
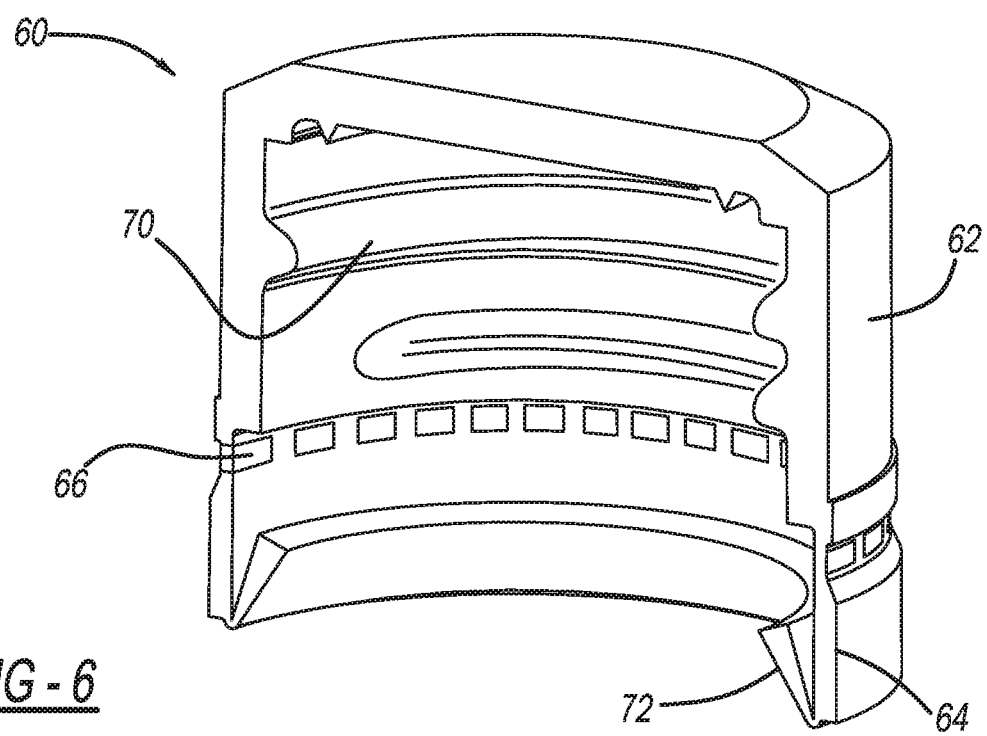
FIG. 6 is a cross-sectional view of the closure of FIG. 5 taken along line 6-6 of FIG. 5.
Figure 7:
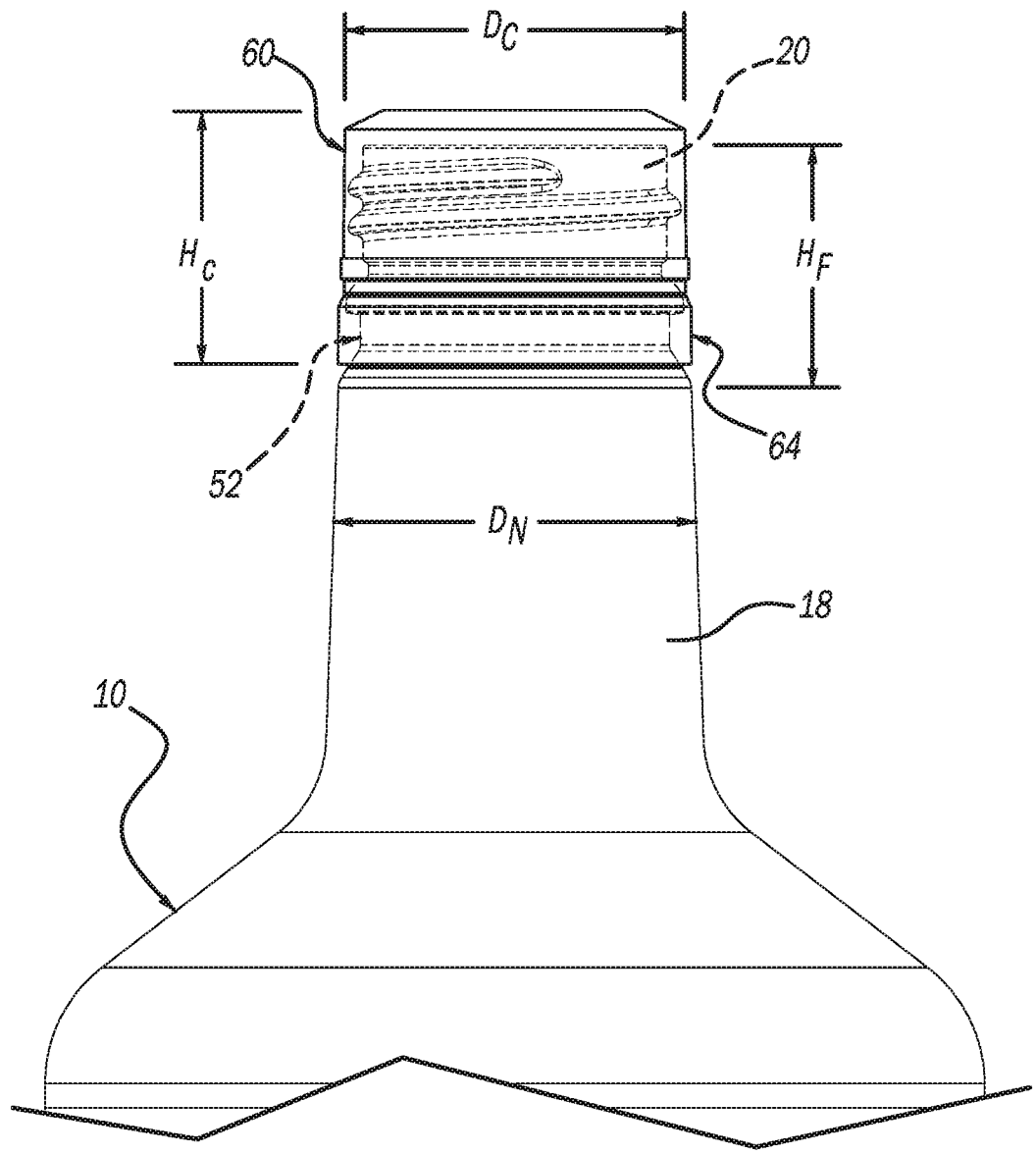
FIG. 7 illustrates the closure of FIG. 5 secured to a finish portion of the container of FIG. 1 in order to close the container.

With reference to FIGS. 5 and 6, the closure 60 will now be described in further detail. The closure 60 generally includes a main body 62, and a frangible tamper band 64, which is connected to the main body 62 at perforated area/ring 66. A tamper tab 72 extends from the frangible tamper band 64 inward into the closure 60. The tamper tab 72 is sized and shaped to pass over the tamper lip 40 of the container finish 20 when the closure 60 is being secured to the finish 20, such as through cooperation between threads 70 of the closure 60 and the threads 32 of the finish 20. The tamper tab 72 slides over the rounded upper surface 42 of the tamper lip 40 as the closure 60 is being screwed onto the finish 20. After the tamper tab 72 has passed over the rounded upper surface 42, the tamper tab 72 will flex inward towards the longitudinal axis A and abut the lower surface 44 of the tamper lip 40. There must be clearance between the bottom surface of the tamper band 64 and the neck 18 so that the neck 18 does not interfere with applying and tightening the closure 60. When the closure 60 is unscrewed and removed from the finish 20, the tamper tab 72 will remain under the tamper lip 40 and the main body 62 will separate from the frangible tamper band 64 at the perforated ring 66. The tamper band 64 is prevented from dropping to far down the neck 18 or the shoulder 16 by the tamper band recess 52, and the tamper band 64 is retained below the tamper lip 40 and above the neck 18 or shoulder 16. With current containers, the tamper band is instead retained by a support flange, which the finish 20 advantageously does not include. Separation of the main body 62 from the frangible tamper band 64 advantageously provides a visual indication that the closure 60 has been removed from the finish 20. FIG. 7 illustrates the closure 60 secured to the finish 20 of the container 10. The overall closure height $H_C$ can be any suitable height, such as between 0.54 inches to 0.80 inches, or less than 0.54 inches on containers with a diameter less than 28 mm. FIG. 11 illustrates the closure 60 (or a shorter version thereof) secured to the finish 20 of another container 10' in accordance with the present disclosure, which does not include the elongated neck 18.

The container 10 can be manufactured in any suitable manner. For example, the container 10 can be blow molded from any suitable preform, such as the preform 110 of FIG. 8. The preform 110 itself can be formed in any suitable manner, such as by injection molding. The preform 110 includes the finish 20, which defines the opening 22 and includes the threads 32 and the tamper lip 40. Extending from the finish 20 is a neck portion 112, a body portion 116, and a base portion 118. After injection blow molding of the preform 110, the neck portion 112 forms the neck 18, the shoulder portion 114 forms the shoulder 16, the body portion 116 forms the body 12, and the base portion 118 forms the base 14.

Figure 9:
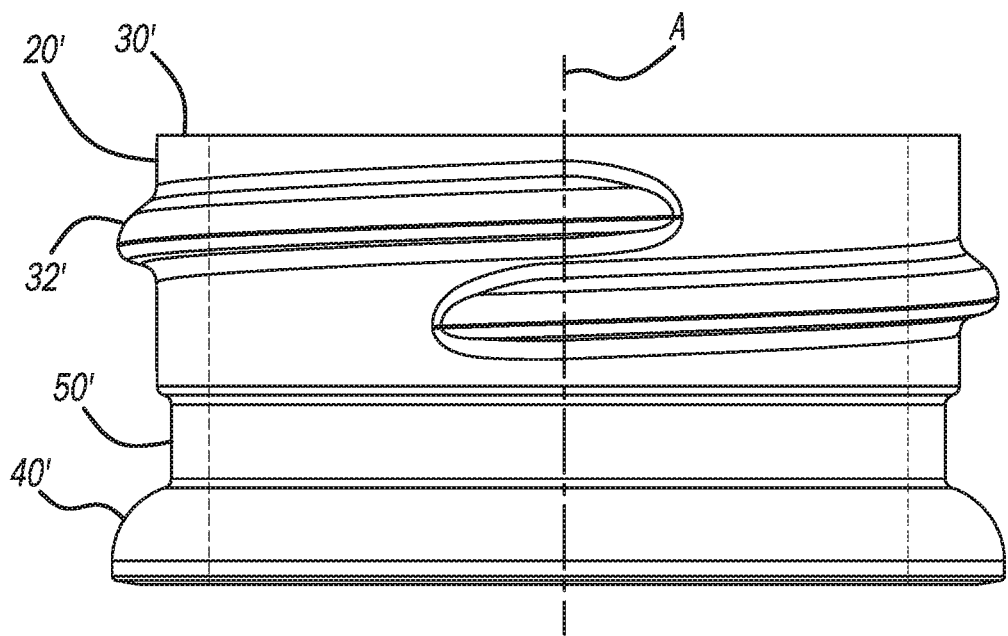
FIG. 9 is a side view of another finish according to the present teachings.
Figure 10:
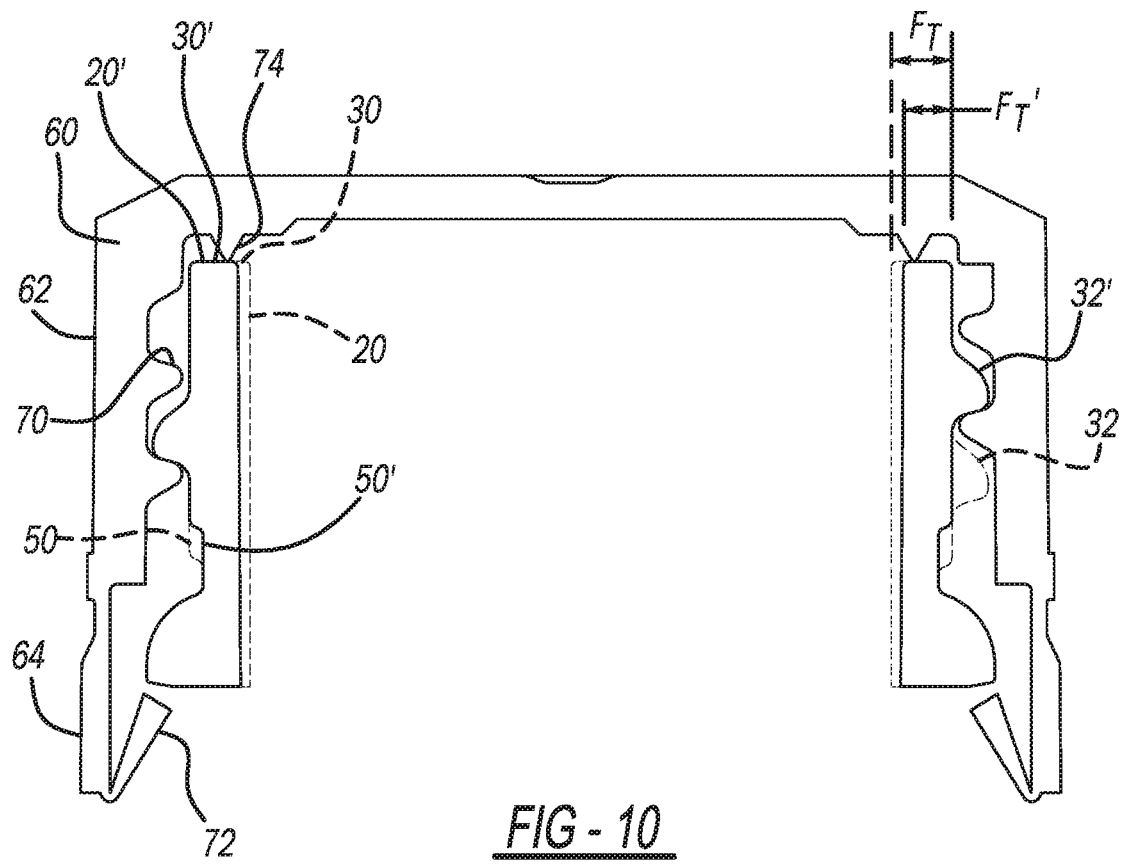
FIG. 10 is a cross-sectional view of the finish of FIG. 9 with the closure of FIGS. 5 and 6 coupled thereto.

With reference to FIGS. 9 and 10, an additional finish 20' in accordance with the present teachings is illustrated. The finish 20' is similar to the finish 20, except for the following differences which make the finish 20' advantageously lighter. Specifically, threads 32' are shorter than the threads 32 in that each one of the threads 32' make only one complete turn around the finish 20'. This is in contrast to the threads 32, which each make 1.5 turns around the finish 20. By making the threads 32' shorter, the threads 32' can be moved upward closer to the top surface 30', and gripper groove 50' can be made taller. Specifically, the gripper groove 50' extends further along a direction parallel to the longitudinal access A, as compared to the gripper groove 50. The gripper groove 50' can be more easily engaged by a suitable gripping or coupling device for moving the finish 20' during manufacturing.

With particular reference to FIG. 10 the finish 20' has a thickness $F_T'$ that is thinner than the finish thickness $F_T$ of the finish 20. The finish thickness $F_T'$ of the finish 20' is generally 0.015 inches thinner than the finish thickness $F_T$ of the finish 20, which makes the finish 20' about 0.648 grams lighter than the finish 20 (when the container 10 is made of PET). Making the finish 20' thinner and lighter advantageously reduces the manufacturing and shipping cost of the container 10. Because the finish 20' has a finish thickness $F_T'$ that is thinner than the finish thickness $F_T$ of the finish 20, a crush bead 74 of the closure 60 will be arranged closer to the inside diameter of the finish 20' as compared to the finish 20 when the closure 60 is secured to the respective finishes 20/20'.

The finish thickness $F_T$ of the finish 20 can be 3.94 mm, or about 3.94 mm. The gripper groove 50 can have a height of 0.71 mm, or about 0.71 mm. The finish thickness $F_T'$ of the finish 20' can have a thickness of 3.14 mm, or about 3.14 mm. The height of the gripper groove 50' can be 2.3 mm, or about 2.3 mm.

The present teachings advantageously provide for reducing the weight of the finish 20, as well as the height of the finish 20, to provide the container 10 with a height to center of gravity ratio that is greater than 0.025, or less than 0.499. The finish 20 can have any suitable weight, such as greater than 2.3 grams, or less than 2.5 grams. The finish 20 according to the present teachings has a weight that is advantageously about 35% less than, to about 44% less than, the weight of an industry standard finish for accepting the same size of closure.

Figure 12:
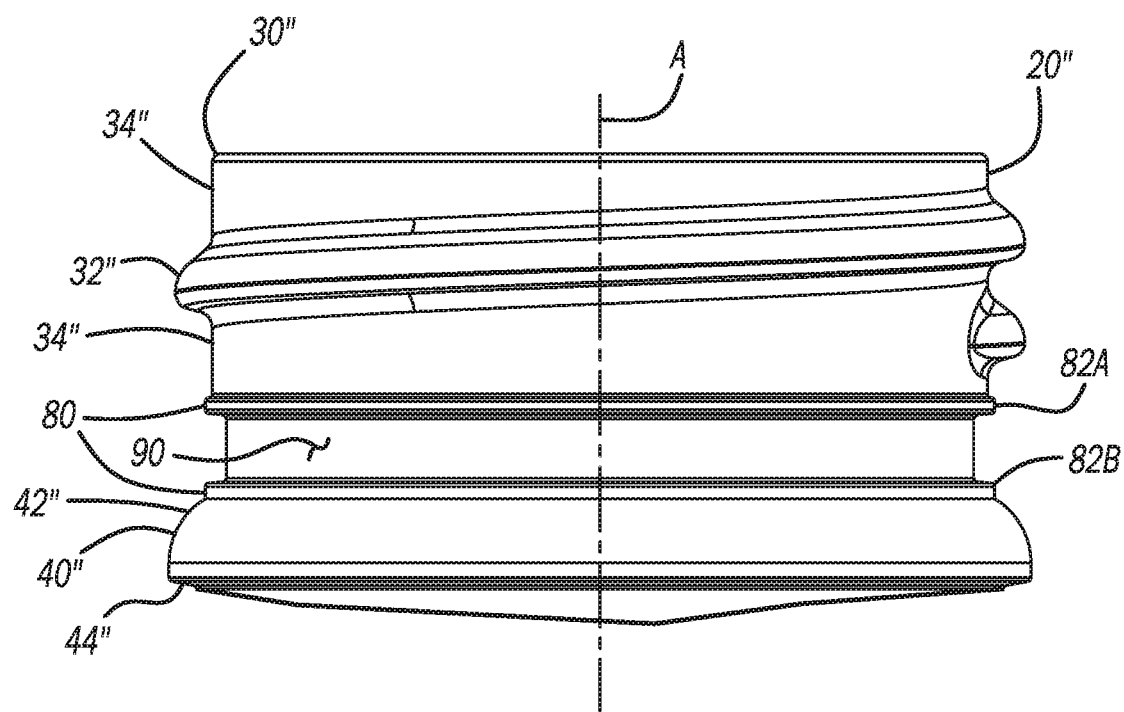
FIG. 12 is a side view of another finish in accordance with the present teachings.
Figure 13:
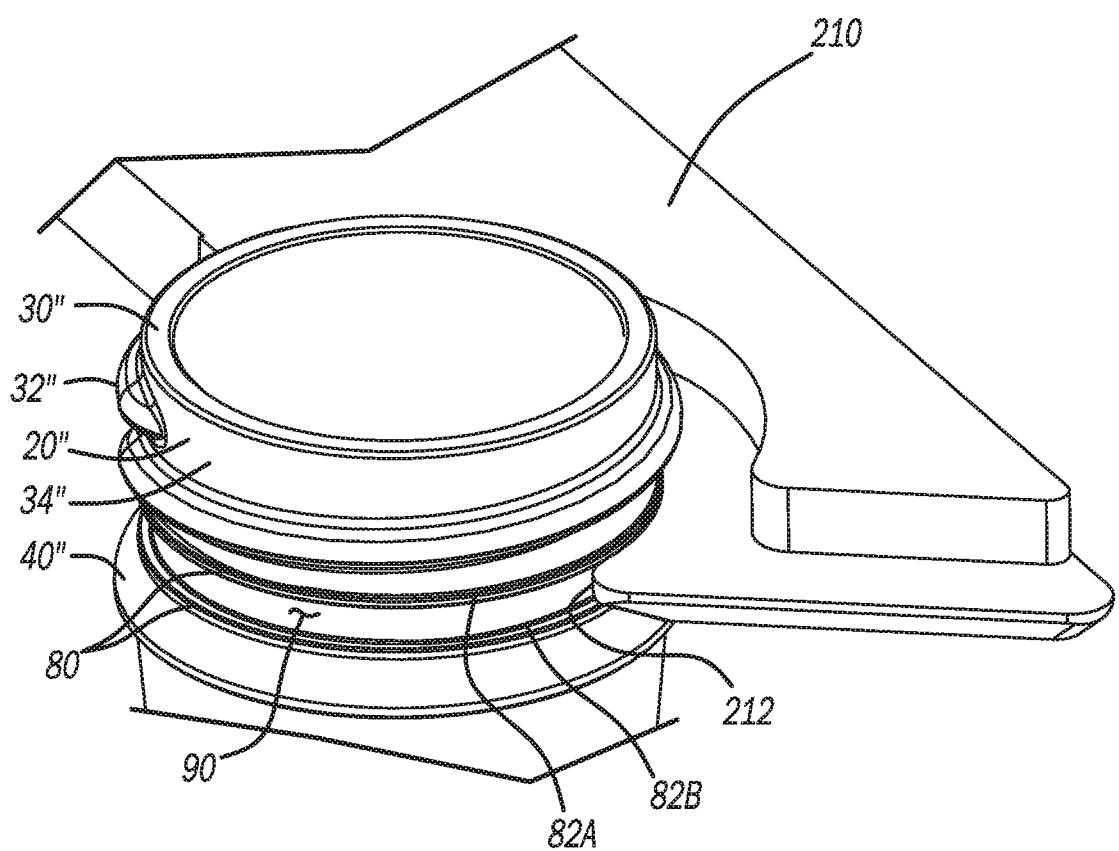
FIG. 13 is a perspective view of the finish of FIG. 12 and a gripper for gripping and maneuvering a preform including the finish.

FIGS. 12 and 13 illustrate another finish in accordance with the present disclosure at reference numeral 20". The finish 20" can be the finish of any suitable preform for forming any suitable container. For example, the preform 110 may include the finish 20" in place of the finish 20, and the containers 10, 110 may include the finish 20" in place of the finish 20 and the finish 20' respectively.

The finish 20" includes numerous features similar to, or the same as, the finish 20. The similar features are designated in FIGS. 12 and 13 using the same reference numerals, but with a double prime (") designation. The description of these similar features set forth above in the description of the finish 20 also applies to the finish 20". Specifically, the description set forth above of the threads 32, the outer surface 34, and the tamper lip 40 (including the rounded upper surface 42 and the lower surface 44) of the finish 20 also applies to the threads 32", the outer surface 34", and the tamper lip 40" (including the rounded upper surface 42" and the lower surface 44") of the finish 20".

Unlike the finish 20 and the finish 20', in place of the gripper groove 50 the finish 20" includes a gripper pad (gripper retainer) 80 between the threads 32" and the tamper lip 40". The gripper pad 80 extends entirely around the finish 20". The gripper pad 80 includes an upper pad surface (upper flange) 82A and a lower pad surface (lower flange) 82B, each of which extend around the finish 20" and protrude outward from the outer surface 34" such that an outermost portion of each of the upper pad surface 82A and the lower pad surface 82B is further from the longitudinal axis A (and a radial center of the finish 20") than the outer surface 34".

The upper pad surface 82A and the lower pad surface 82B are spaced apart from one another. Between the upper pad surface 82A and the lower pad surface 82B is a gripper groove 90 formed in the gripper pad 80. The gripper groove 90 is recessed inward beneath the outer surface 34". Thus, the gripper groove 90 is closer to the longitudinal axis A (and the radial center of the finish 20") than the outer surface 34" and both the upper and lower pad surfaces 82A and 82B.

The gripper groove 90 is sized and shaped to cooperate with any suitable positioning tool for moving and positioning any suitable preform including the finish 20", such as the preform 110 for example. An example of such a suitable positioning tool is the gripper 210. The gripper 210 includes a curved edge 212, which is sized and shaped to cooperate with about one half of the groove 90 between the upper and lower pad surfaces 82A and 82B.

Figure 14:
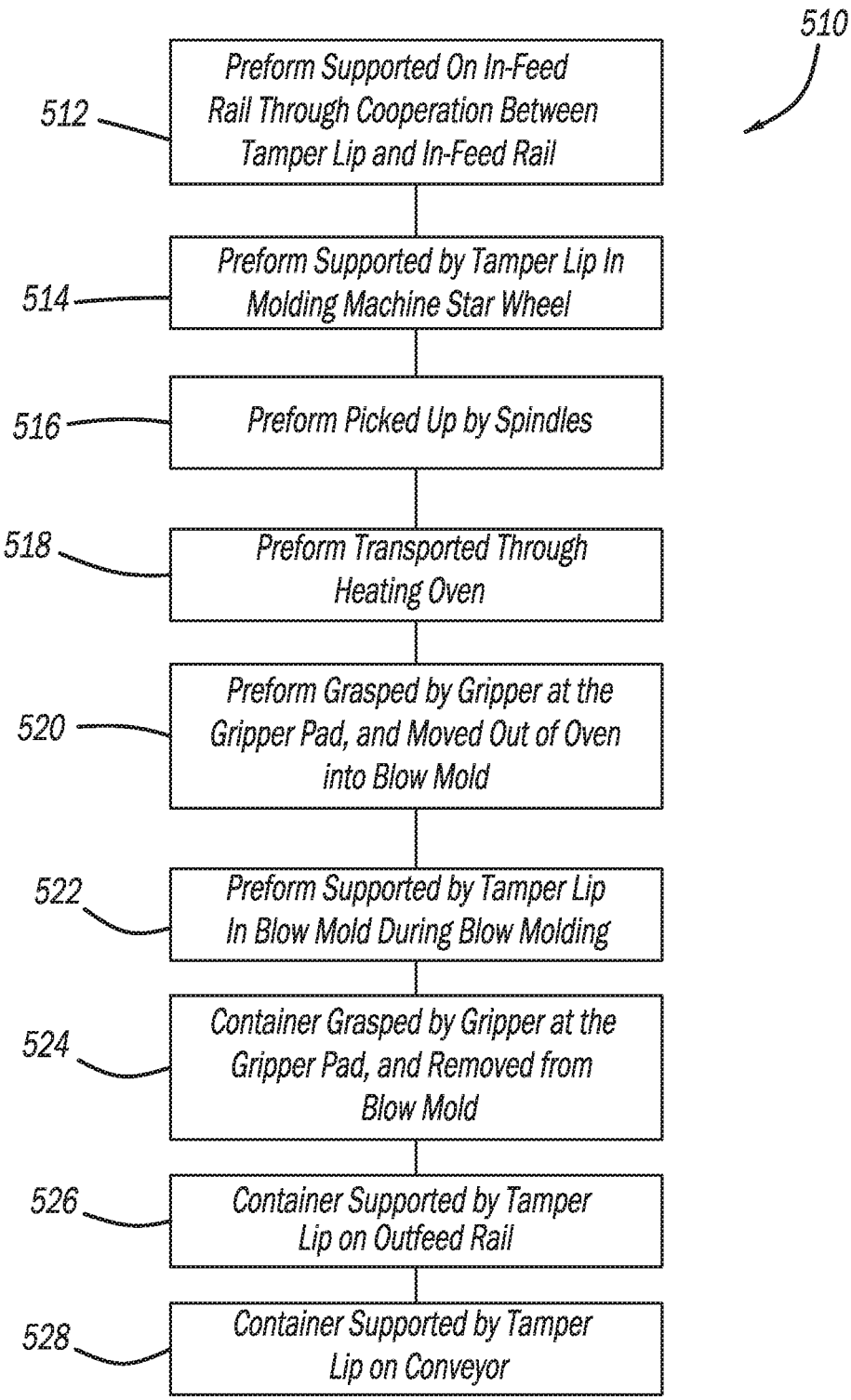
FIG. 14 sets forth a method for maneuvering and supporting the perform including the finish of FIG. 12 during blow molding.

During the blow molding process, the finish 20" is engaged at the tamper lip 40" and/or the gripper pad 80 to move and support the preform that the finish 20" is included with, such as the preform 110 for example. FIG. 14 sets forth a method 510 for moving and/or supporting the finish 20" at various exemplary stages of the blow molding process. For example, at block 512 the preform 110 is supported on a molding machine in-feed rail through cooperation between the tamper lip 40" and the in-feed rail. At bock 514, the preform 110 is moved to a molding machine star wheel, where the preform 110 is supported through cooperation between the tamper lip 40" and the star wheel. At block 516, the preform 110 is picked up by spindles, and at block 518 the preform 110 is transported through a heating oven. At block 520, the gripper 210 grasps the preform 110 through cooperation between the curved edge 212 and the gripper pad 80, and the gripper 210 moves the preform 110 out of the oven and into a blow mold of any suitable container, such as the container 10 or the container 10'. Specifically, the curved edge 212 contacts the groove 90 between the upper pad surface 82A and the lower pad surface 82B.

At block 522, the preform is supported in the blow mold by the tamper lip 40" during blow molding. At block 524, the blown container 10 (or the container 10' or any other suitable container) is again grasped by the gripper through cooperation between the curved edge 212 and the gripper pad 80, and the gripper 210 moves the preform 110 out from within the blow mold. At block 526, the container 10 is supported by an outfeed rail through cooperation between the tamper lip 40" and the outfeed rail. At block 528, the container 10 is supported on a conveyor through cooperation between the tamper lip 40" and the conveyor, and the container 10 is transported to any suitable location, such as a filling or packing station.

The finish 20" thus advantageously includes the threads 32" and the tamper lip 40" without a dedicated support flange. Therefore, the tamper lip 40" serves a dual purpose. A first purpose of the tamper lip 40" is to cooperate with the tamper tab 72 of the closure 60 such that when the closure is removed the tamper tab 72 is separated from the closure 60 and retained on the finish 20" by the tamper lip 40" to indicate that the container 10 has been opened. Another purpose of the tamper lip 40" is to provide support for the preform 110 at specific points during manufacturing, such as at least at blocks 512, 514, 522, 526, and 528. The gripper pad 80 advantageously allows the finish 20" to be gripped at specific points during manufacturing as well through cooperation between the curved edge 212 and the gripper pad 80, such as at least at blocks 520 and 524. One skilled in the art will appreciate that the present disclosure provides numerous other advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A polymeric container comprising;
    a base;
    a body extending from the base; and
    a finish defining an opening through which a product can pass into, and out of, an internal volume of the container defined at least in part by the body;
    finish threads of the finish that are configured to cooperate with closure threads of a closure to secure the closure to the finish;
    a tamper lip of the finish below the finish threads, the tamper lip configured to cooperate with a tamper band of the closure, during blow molding of the polymeric container from a preform the preform is supported by the tamper lip;
    a recess below the tamper lip that retains the tamper band below the tamper lip when the closure is removed from cooperation with the finish; and
    a gripper retainer of the finish between the finish threads and the tamper lip, the gripper retainer configured to cooperate with a gripper for grasping the finish, the gripper retainer includes a groove defined between an upper flange and a lower flange;
    wherein:
        the upper flange includes a first upper surface facing the finish threads, a first lower surface that is opposite to the first upper surface, and a first outer surface including a first outermost portion of the upper flange;
        the lower flange includes a second upper surface facing the first lower surface and a second outer surface including a second outermost portion of the lower flange, the second outer surface is immediately adjacent to a rounded upper surface of the tamper lip;
        both the upper flange and the lower flange extend outward such that the first outermost portion of the upper flange and the second outermost portion of the lower flange are each further from a radial center of the finish than the groove and are each closer to the radial center of the finish than outermost edges of the finish threads;
        the first outermost portion of the upper flange and the second outermost portion of the lower flange are each further from the radial center of the finish than an outermost surface of the finish at an area of the finish between the finish threads and the upper flange; and
        the groove is recessed inward towards the radial center of the finish such that the groove is an inner-most outer surface of the finish.

2. The polymeric container of claim 1, wherein the finish is configured to accept a closure that has a diameter of 18 mm to 43 mm.

3. The polymeric container of claim 1, wherein the tamper lip is configured to be engaged to support the preform of the polymeric container in a mold or a blow mold striker plate, on infeed rails of a blow molding machine, and on a star wheel assembly.

4. The polymeric container of claim 1, wherein the groove is configured to cooperate with the gripper for the gripper to grasp the finish.

5. The polymeric container of claim 1, wherein the gripper retainer extends entirely around the finish.

* * * * *